(12) United States Patent
Yashiro et al.

(10) Patent No.: US 9,304,368 B2
(45) Date of Patent: Apr. 5, 2016

(54) ELECTROCHROMIC DEVICE AND PRODUCTION METHOD THEREOF

(71) Applicants: Tohru Yashiro, Kanagawa (JP); Shigenobu Hirano, Kanagawa (JP); Toshiya Sagisaka, Kanagawa (JP); Mamiko Inoue, Tokyo (JP); Hiroyuki Takahashi, Kanagawa (JP); Koh Fujimura, Tokyo (JP); Yoshihisa Naijo, Kanagawa (JP); Kazuaki Tsuji, Kanagawa (JP); Yoshinori Okada, Kanagawa (JP); Sukchan Kim, Kanagawa (JP); Keiichiroh Yutani, Kanagawa (JP); Tamotsu Horiuchi, Shizuoka (JP)

(72) Inventors: Tohru Yashiro, Kanagawa (JP); Shigenobu Hirano, Kanagawa (JP); Toshiya Sagisaka, Kanagawa (JP); Mamiko Inoue, Tokyo (JP); Hiroyuki Takahashi, Kanagawa (JP); Koh Fujimura, Tokyo (JP); Yoshihisa Naijo, Kanagawa (JP); Kazuaki Tsuji, Kanagawa (JP); Yoshinori Okada, Kanagawa (JP); Sukchan Kim, Kanagawa (JP); Keiichiroh Yutani, Kanagawa (JP); Tamotsu Horiuchi, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/593,035

(22) Filed: Jan. 9, 2015

(65) Prior Publication Data

US 2015/0198857 A1    Jul. 16, 2015

(30) Foreign Application Priority Data

Jan. 15, 2014   (JP) ................................. 2014-005482

(51) Int. Cl.
*G02F 1/153*    (2006.01)
*G02F 1/15*    (2006.01)
(Continued)

(52) U.S. Cl.
CPC .............. *G02F 1/1525* (2013.01); *G02F 1/155* (2013.01); *G02F 1/157* (2013.01); *G02F 1/161* (2013.01);
(Continued)

(58) Field of Classification Search
CPC ....... G02F 1/15; G02F 1/1525; G02F 1/1523; G02F 1/153; G02F 1/155; G02F 1/157; G02F 1/161; G02F 2001/1515; G02F 2001/1519; G02F 2001/1521; G02F 2001/1536; H01G 9/022; H01G 9/025
USPC ................. 359/265, 267, 270, 271, 274, 275; 156/701; 427/58
See application file for complete search history.

(56) References Cited

U.S. PATENT DOCUMENTS 4,550,982 A    11/1985   Hirai
5,011,751 A *  4/1991   Yoneyama ........... C08G 61/123
                                                      429/247

(Continued)

FOREIGN PATENT DOCUMENTS

EP    2597127 A1    5/2013
JP    03-073081    11/1991

(Continued)

OTHER PUBLICATIONS

U.S. Appl. No. 14/752,244, filed Jun. 26, 2015, Yoshihisa Naijo et al.
(Continued)

*Primary Examiner* — Loha Ben
(74) *Attorney, Agent, or Firm* — Cooper & Dunham LLP (57) ABSTRACT

An electrochromic device, which contains: one support; a first electrode layer formed on the support; a second electrode layer provided to face the first electrode layer; an electrochromic layer provided to be in contact with the first electrode layer or the second electrode layer; a solid electrolyte layer containing inorganic particles, which is filled between the first electrode layer and the second electrode layer, and is provided to be in contact with the electrochromic layer; and a protective layer provided on the second electrode layer.

8 Claims, 3 Drawing Sheets

(51) Int. Cl.
 *G02F 1/155* (2006.01)
 *G02F 1/157* (2006.01)
 *G02F 1/161* (2006.01)
 *H01G 9/025* (2006.01)

(52) U.S. Cl.
 CPC ............. *G02F 1/1521* (2013.01); *G02F 1/1523* (2013.01); *G02F 2001/1515* (2013.01); *G02F 2001/1519* (2013.01); *G02F 2001/1536* (2013.01); *H01G 9/025* (2013.01); *Y10T 156/11* (2015.01)

(56) References Cited

U.S. PATENT DOCUMENTS

| | | | | |
|---|---|---|---|---|
| 5,016,991 | A * | 5/1991 | Mason | H01B 1/122 252/62.2 |
| 5,130,842 | A * | 7/1992 | Gauthier | B29C 35/02 219/203 |
| 5,206,756 | A * | 4/1993 | Cheshire | G02F 1/1525 252/62.2 |
| 6,337,758 | B1 * | 1/2002 | Beteille | G02F 1/1533 359/265 |
| 6,992,808 | B2 * | 1/2006 | Shinozaki | G02F 1/15 359/265 |
| 7,057,789 | B2 * | 6/2006 | Shinozaki | G02F 1/1508 359/265 |
| 7,312,914 | B2 * | 12/2007 | Shinozaki | G02F 1/15 345/105 |
| 8,384,983 | B2 | 2/2013 | Yashiro et al. | |
| 8,531,754 | B2 | 9/2013 | Fujimura et al. | |
| 8,593,715 | B2 | 11/2013 | Yashiro et al. | |
| 8,687,262 | B2 | 4/2014 | Yashiro et al. | |
| 8,736,941 | B2 | 5/2014 | Naijo et al. | |
| 8,743,048 | B2 | 6/2014 | Takahashi et al. | |
| 8,970,938 | B2 * | 3/2015 | Granqvist | G02F 1/1525 359/265 |
| 2005/0248824 | A1 | 11/2005 | Fukazawa et al. | |
| 2009/0231663 | A1 | 9/2009 | Hirano et al. | |
| 2009/0231664 | A1 | 9/2009 | Shibuya et al. | |
| 2009/0256157 | A1 | 10/2009 | Kondo et al. | |
| 2011/0075248 | A1 | 3/2011 | LeCain et al. | |
| 2012/0050838 | A1 | 3/2012 | Hirano et al. | |
| 2012/0125414 | A1 | 5/2012 | Kamezaki et al. | |
| 2012/0139825 | A1 | 6/2012 | Yashiro et al. | |
| 2013/0135703 | A1 | 5/2013 | Okada et al. | |
| 2013/0250394 | A1 | 9/2013 | Okada et al. | |
| 2013/0258439 | A1 | 10/2013 | Naijo et al. | |
| 2013/0293825 | A1 | 11/2013 | Trajkovska et al. | |
| 2013/0335802 | A1 | 12/2013 | Kim et al. | |
| 2014/0078569 | A1 | 3/2014 | Takahashi et al. | |
| 2014/0212705 | A1 | 7/2014 | Horiuchi et al. | |
| 2014/0268284 | A1 | 9/2014 | Naijo et al. | |
| 2015/0168796 | A1 * | 6/2015 | Yashiro | G02F 1/161 359/265 |

FOREIGN PATENT DOCUMENTS

| | | |
|---|---|---|
| JP | 4105537 | 4/2008 |
| JP | 2014-112183 | 6/2014 |

OTHER PUBLICATIONS

Chemistry of Materials review 2011,23,397-415 Navigating the Color Palette of Solution-Processable Electrochromic Polymers(Reynolds).

Macromolecules 1996,29 7629-7630(Reynolds).

European search report dated Apr. 24, 2015 in corresponding European Patent Application No. 15151234.0.

* cited by examiner

ELECTROCHROMIC DEVICE AND PRODUCTION METHOD THEREOF

BACKGROUND OF THE INVENTION

1. Field of the Invention

The present invention relates to an electrochromic device and a production method thereof.

2. Description of the Related Art

A phenomenon that an oxidation and reduction reaction is reversely carried out to reversely change a color as voltage is applied is called electrochromism. A device utilizing this electrochromism is an electrochromic device. Various researches have been conducted on an electrochromic device to realize an application derived from properties of electrochromism.

As for an electrochromic material used for the electrochromic device, there are an organic material and an inorganic material. The organic materials can be colored in a various colors depending on the molecular structures thereof, and therefore the organic materials are promising materials to be used in a color display device. On the other hand, the inorganic material has a problem in controlling a color. In the case where a solid electrolyte layer is used, particularly, the inorganic material excels in durability. Therefore, application of the inorganic material in a light control glass or ND filter, which is an application where a low chromaticity is an advantage, has been studied using the aforementioned characteristics. However, a device using a solid electrolyte layer has a problem that a response speed is slow.

The electrochromic device has a structure where an electrochromic material is formed between two electrodes facing to each other, and the space between the electrodes is filled with an electrolyte capable of ion conduction. In this structure, an oxidation and reduction reaction is carried out. Electrochromism is an electrochemical phenomenon, hence a performance (ion conductivity) of the electrolyte layer affects a response speed or a memory effect of color. In the case where the electrolyte layer is in a liquid state where an electrolyte is dissolved in a solvent, a desired response tends to be attained. However, an improvement thereof by solidification or gelation has been studied in view of strength of an element, and reliability.

Conventionally, an electrolytic solution has been used in a battery or electrochromic device as an electrochemical element. Therefore, the electrolytic solution is leaked, and the contents inside the battery are dried due to evaporation of the solvent. Inside the battery container, moreover, part of the barrier is dried due to deviation of the electrolytic solution. These factors may cause an increase in internal impedance, and internal short circuit.

Especially in the case where the electrochromic device is used as a light control glass or a display, at least one side of the electrochromic device needs to be sealed with a transparent material, such as glass, or a plastic. Therefore, it is difficult to completely seal the electrolyte with a metal or the like, hence leak or evaporation of the electrolytic solution is a sever problem.

As for a method for solving the aforementioned problems, use of a polymer solid electrolyte is proposed. Examples of the polymer solid electrolyte include a solid solution between a matrix polymer containing an oxyethylene chain or an oxypropylene chain, and an inorganic salt. These solid solutions are complete solids, and they have excellent processability, but having a problem in electric conductivity.

In order to improve electric conductivity of the polymer solid electrolyte, proposed are a method where an organic electrolytic solution is dissolved in a polymer to formed into a semi-solid (see, for example, Japanese Patent Application Publication (JP-B) No. 03-73081), and a method where a liquid monomer to which an electrolyte is added, and the liquid monomer is reacted through a polymerization reaction to thereby form a crosslinked polymer containing the electrolyte. However, these proposed methods have not yet reached the level of practical use.

Meanwhile, the electrochromic device is typically produced by forming an electrochromic material between two electrodes facing each other, followed by bonding via an electrolyte layer capable of ion conduction. If the electrochromic device can be produced without this bonding process, the device can be formed on a various sites, such as a curved surface, hence an applicable ranges is widen, and the electrochromic device can be produced at a low cost, as a support of one side is not necessary.

In a conventional art, however, it has been difficult to form an electrochromic device on a support in accordance with a thin film process. Specifically, in the case where an electrode is formed on an electrolyte layer in order to omit the bonding process, there is the aforementioned problem that a response speed is slow, as an all solid electrolyte layer is used. If an organic material layer is used as an all solid electrolyte layer, moreover, electric resistance of an electrode layer to be formed on an electrolyte layer tends to be high, and the electrochromic device cannot be regularly driven with oxidation reduction. Particularly when an oxide layer, such as ITO, $SnO_2$, and AZO formed by vacuum film formation, which are typically adapted as a transparent electrode, there is a problem that it is difficult to achieve transparency and electric conductivity at the same time.

In the case where an inorganic material layer is used as an all solid electrolyte layer, on the other hand, an electrochromic compound for use is limited to an inorganic electrochromic compound. Examples where the inorganic electrochromic compound is used include an electrochromic element having a structure, in which a reduction coloring layer and an oxidation coloring layer are provided to face each other with a solid electrolyte layer being in between.

In the electrochromic element, the reduction coloring layer is composed of a material containing tungsten oxide and titanium oxide, and the oxide coloring layer is composed of a material containing nickel oxide. Moreover, propose is an electrochromic element, in which a transparent intermediate layer that is composed of metal oxide other than nickel oxide, or a metal, or a complex containing metal oxide other than nickel oxide and a metal as a main component is provided between the oxide coloring layer and a solid electrolyte layer (see, for example, is Japanese Patent (JP-B) No. 4105537). This literature discloses that repetition properties and response are improved by forming the intermediate layer, hence coloring-discharging can be performed within a few seconds.

However, this proposed electrochromic element has a complicated structure, and cannot be easily increased in its side, as multiple layers of the inorganic compound layer are formed by vacuum film formation, as well as increasing a cost. Moreover, it cannot avoid an influence from heat during the film formation process, and therefore the substrate for use is limited to a heat resistant material, such as glass. Furthermore, the inorganic electrochromic reaction is easily influenced by moisture, and a color tone of the inorganic electrochromic compound is limited to a tone of blue.

Accordingly, there is a need for promptly providing an electrochromic device which can be produced without a bonding process.

SUMMARY OF THE INVENTION

The present invention aims to provide a high performance electrochromic device that can be produced without a bonding process.

As the means for solving the aforementioned problems, the electrochromic device of the present invention contains:
one support;
a first electrode layer formed on the support;
a second electrode layer provided to face the first electrode layer;
an electrochromic layer provided to be in contact with the first electrode layer or the second electrode layer;
a solid electrolyte layer containing inorganic particles, which is filled between the first electrode layer and the second electrode layer, and is provided to be in contact with the electrochromic layer; and
a protective layer provided on the second electrode layer.

The present invention can solve the aforementioned various problems in the art, can achieve the aforementioned object, and can provide a high performance electrochromic device that can be produced without a bonding process.

DETAILED DESCRIPTION OF THE INVENTION (Electrochromic Device and Production Method of Electrochromic Device)

The electrochromic device of the present invention contains: one support; a first electrode layer formed on the support; a second electrode layer provided to face the first electrode layer; an electrochromic layer provided to be in contact with the first electrode layer or the second electrode layer; a solid electrolyte layer containing inorganic particles, which is filled between the first electrode layer and the second electrode layer, and is provided to be in contact with the electrochromic layer; and a protective layer provided on the second electrode layer. The electrochromic device of the present invention may further contain other layers according to the necessity.

Since the electrochromic device contains one support, and does not need the other support (at the other side), the electrochromic device is excellent in productivity thereof, and a large size-electrochromic device can be provided.

The electrolyte layer is a solid electrolyte layer in which inorganic particles are mixed. By mixing the inorganic particles, a damage applied to the electrolyte layer due to heat at the time of the formation of the second electrode layer can be reduced, and the second electrode layer can be uniformly formed, and an excellent oxidation reduction reaction can be performed.

Examples of other layers include an antideterioration layer, and a release layer.

The method for producing an electrochromic device according to the present invention is a production method of the electrochromic device of the present invention. The method contains peeling a portion that is present above the second electrode layer from the support, to thereby form a contact area with the second electrode layer, and may further contain other steps.

In the production method of the electrochromic device, a contact area with the second electrode layer is formed by peeling a portion that is present above the second electrode layer, so that lines can be connected with the second electrode layer at the predetermined position. Therefore, the electrochromic device formed on the support can be assembled after processing into a predetermined shape. Moreover, it is not necessary to prepare a mold or member depending on a shape of a product, and thus it is easy to produce various types of products with a small quantity.

In accordance with the production method of the electrochromic device, an electrochromic device can be produced without a bonding process. Therefore, an electrochromic device can be formed on various sites, and a possible application of the electrochromic device can be widen.

Examples of other steps include: a step where a first electrode layer and an electrochromic layer are sequentially provided on a support; a step where an electrolyte layer is formed on the electrochromic layer; a step where a second electrode layer is formed on the electrolyte layer; and a step where a protective layer is formed on the second electrode layer.

The embodiments are explained with reference to drawings hereinafter. Note that, in each drawing, the same reference number is provided to the same constitutional component, and duplicated descriptions may be omitted from below.

<Electrochromic Device of First Embodiment, and Production Method Thereof>

Figure 1:
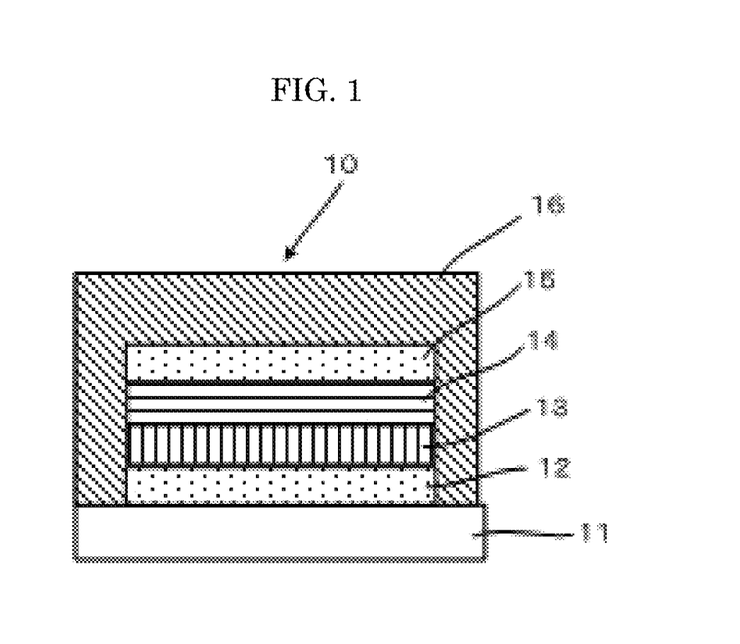
FIG. 1 is a schematic cross-sectional view illustrating one example of an electrochromic device of the first embodiment.

FIG. 1 is a schematic cross-sectional view illustrating one example of the electrochromic device of the first embodiment. With reference to FIG. 1, the electrochromic device 10 contains a support 11, and a first electrode layer 12, an electrochromic layer 13, an electrolyte layer 14, a second electrode layer 15, and a protective layer 16, which are sequentially provided on the support 11.

In the electrochromic device 10, the first electrode layer 12 is provided on the support 11, and the electrochromic layer 13 is provided in contact with the first electrode layer 12. On the electrochromic layer 13, the second electrode layer 15 is provided in a manner that the second electrode layer faces the first electrode layer 12 via the electrolyte layer 14.

For convenience, surfaces of the first electrode layer 12 and the second electrode layer 15 faces each other are each referred to as an "inner face", and opposite surfaces to the inner faces thereof are each referred to as an "outer face" in descriptions of each of the first electrode layer 12 and the second electrode layer 15. In the present embodiment, the inner face of the first electrode layer 12 is in contact with the electrochromic layer 13, and the outer face of the first electrode layer 12 is in contact with the support 11. Moreover, the inner face of the second electrode layer 15 is in contact with the electrolyte layer 14, and the outer face of the second electrode layer 15 is in contact with the protective layer 16. Note that, the inner face and the outer face may be each a flat surface, or a curved surface.

A production method of the electrochromic device 10 of the first embodiment contains: sequentially providing a first electrode layer 12 and an electrochromic layer 13 on a support 11; forming an electrolyte layer 14 on the electrochromic layer 13, followed by curing the electrolyte layer 14, and providing a second electrode layer 15 thereon; and a providing a protective layer 16 on the second electrode layer 15. The method may further contain other steps according to the necessity.

The electrolyte layer 14 is a solid electrolyte layer, in which inorganic particles are mixed. By mixing the inorganic particles, a uniform second electrode layer 15 can be formed, as well as reducing a damage of the electrolyte layer 14 caused by heat during the formation of the second electrode layer 15, and therefore an excellent oxidation and reduction reaction is carried out. Note that, the inorganic particles may be mixed in the electrochromic layer.

As voltage is applied between the first electrode layer 12 and the second electrode layer 15, within the electrochromic device 10, the electrochromic layer 13 receives electric charge to carry out an oxidation and reduction reaction to thereby color or discharge.

As mentioned above, in accordance with the electrochromic device of the present embodiment, a second electrode layer of a low resistance can be formed on a surface of an electrolyte layer 14, without deteriorating the electrolyte layer 14, hence a performance of the electrochromic device can be improved.

Moreover, the method for forming the electrochromic device of the first embodiment can produce an electrochromic device without a conventional bonding process, hence the electrochromic device can be formed on a various sites, increasing an application range of the electrochromic device.

Moreover, the electrochromic device according to the first embodiment contains one support, and does not require the other support at the other side, hence the electrochromic device having excellent productivity (enlarged size) can be provided.

Furthermore, the electrochromic device according to the first embodiment realizes the electrochromic device, which is also excellent in coloring properties, as an organic electrochromic material is used.

Each constitutional element of the electrochromic device 10 of the first embodiment is specifically explained hereinafter.

[Support]

The support 11 is configured to support the first electrode layer 12, the electrochromic layer 13, the electrolyte layer 14, the second electrode layer 15, and the protective layer 16.

As for the support 11, a conventional organic material or inorganic material can be used as it is, provided that the support can support the aforementioned layers.

Examples of the support 11 include a glass substrate, such as non-alkali glass, borosilicate glass, float glass, and soda-line glass. As for the support 11, moreover, a resin substrate may be used, and examples of the resin substrate include a polycarbonate resin, an acrylic resin, polyethylene, polyvinyl chloride, polyester, an epoxy resin, a melamine resin, a phenol resin, a polyurethane resin, and a polyimide resin. As for the support 11, furthermore, a metal substrate, such as aluminium, stainless steel, and titanium, may be used.

In the case where the electrochromic device 10 is a reflective display device, which is viewed from the side of the second electrode layer 15, the support 11 does not require transparency. In the case where a conductive metal material is used as the support 11, moreover, the support 11 can also function as the first electrode layer 12. Furthermore, a surface of the support 11 may be coated with a transparent insulating layer, or an anti-reflection layer, in order to enhance moisture vapor barrier properties, gas barrier properties, and visibility.

[First Electrode Layer and Second Electrode Layer]

A material of the first electrode layer 12 or the second electrode layer 15 is appropriately selected depending on the intended purpose without any limitation, provided that it is a material having electroconductivity. In the case where the electrochromic device is used as a light control glass, it is necessary to secure light transmittance. Therefore, a transparent conductive material, which is transparent and has excellent conductivity, is used as the material of the first electrode layer and that of the second electrode layer. Use of such a material can attain transparency of a glass, as well as enhancing a contrast of a color.

Examples of the transparent conductive material include inorganic materials, such as tin-doped indium oxide (referred as "ITO" hereinafter), fluorine-doped tin oxide (referred as "FTO" hereinafter), and antimony-doped tin oxide (referred as "ATO" hereinafter). Among them, preferred is an inorganic material containing at least one selected from the group consisting of indium oxide (referred as "In oxide" hereinafter), tin oxide (referred as "Sn oxide" hereinafter), and zinc oxide (referred as "Zn oxide"), which is formed by vacuum film formation.

The In oxide, Sn oxide, and Zn oxide are materials that can be easily formed into a film by sputtering, and also are materials that can attain both excellent transparency and electric conductivity. Among them, InSnO, GaZnO, SnO, $In_2O_3$, and ZnO are particularly preferable. Moreover, transparent silver, gold, a network electrode such as carbon nanotube and metal oxide, and a composite layer thereof are effective. The network electrode is an electrode, in which a carbon nanotube, or a high-conductive non-transparent material is formed into a fine network to give a transmittance.

A thickness of each of the first electrode layer 12 and the second electrode layer 15 is adjusted to give an electric resistance value required for an oxidation and reduction reaction of the electrochromic layer 13.

In the case where ITO is used as a material of the first electrode layer 12 and the second electrode layer 15, a thickness of each of the first electrode layer 12 and the second electrode layer 15 is preferably 20 nm to 500 nm, more preferably 50 nm to 200 nm.

In the case where the electrochromic device is used as a light control mirror, moreover, either the first electrode layer 12 or the second electrode layer 15 may have a structure having a reflecting function. In this case, a metal material can be contained as a material of the first electrode layer 12 and the second electrode layer 15. Examples of the metal material include Pt, Ag, Au, Cr, rhodium, an alloy thereof, and a laminate structure thereof.

Examples of a formation method of each of the first electrode layer 12 and the second electrode layer 15 include vacuum vapor deposition, sputtering, and ion plating. Moreover, examples of the formation method that allows coating of a material of each of the first electrode layer 12 and the second electrode layer 15 include various printing methods, such as spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, inverse printing, and inkjet printing.

[Electrochromic Layer]

The electrochromic layer 13 is a layer containing an electrochromic material.

The electrochromic material may be an inorganic electrochromic compound, or an organic electrochromic compound. Moreover, a conductive polymer known to have electrochromism may be used.

Examples of the inorganic electrochromic compound include tungsten oxide, molybdenum oxide, iridium oxide, and titanium oxide.

Examples of the organic electrochromic compound include viologen, rear-earth phthalocyanine, and styryl.

Examples of the conductive polymer include polypyrrole, polythiophene, polyaniline, and derivatives thereof.

The electrochromic layer 13 preferably has a structure where an organic electrochromic compound is born on conductive or semiconductive particles. Specifically, it is a structure where particles having particle diameters of about 5 nm to about 50 nm are bonded on a surface of the electrode, and an organic electrochromic compound having a polar group, such as phosphonic acid, a carboxyl group, and a silanol group is adsorbed on surfaces of the particles.

In accordance with this structure, electrons are efficiently injected into the organic electrochromic compound utilizing an effect of a large surface area of the particles. Therefore, the electrochromic device containing the electrochromic layer of the aforementioned structure can achieve high speed response compared to a conventional electrochromic display element. Moreover, a transparent film can be formed as a display layer using the particles, and thus high coloring density of the electrochromic dye can be attained. Moreover, a plurality of the organic electrochromic compounds may be born on the conductive or semiconductive particles.

Specific examples of the polymer-based and dye-based electrochromic compound include: a low molecular organic electrochromic compound, such as an azo benzene-based electrochromic compound, an anthraquinone-based electrochromic compound, a diaryl ethane-based electrochromic compound, a dihydroprene-based electrochromic compound, a dipyridine-based electrochromic compound, a styryl-based electrochromic compound, a styryl spiropyran-based electrochromic compound, a spiro oxazine-based electrochromic compound, a spirothiopyran-based electrochromic compound, a thioindigo-based electrochromic compound, a tetrathiafulvalene-based electrochromic compound, a terephthalic acid-based electrochromic compound, a triphenylmethane-based electrochromic compound, a triphenylamine-based electrochromic compound, a naphthopyran-based electrochromic compound, a viologen-based electrochromic compound, a pyrazoline-based electrochromic compound, a phenazine-based electrochromic compound, a phenylenediamine-based electrochromic compound, a phenoxazine-based compound, a phenothiazine-based electrochromic compound, a phthalocyanine-based electrochromic compound, a fluoran-based electrochromic compound, a fulgide-based electrochromic compound, a benzopyran-based electrochromic compound, and metallocene-based electrochromic compound; and a conductive polymer compound, such as aniline, and polythiophene. These may be used alone, or in combination.

Among them, a viologen-based compound, and a dipyridine-based compound are preferable, as they have low coloring-discharging electric potential, and exhibit an excellent color value. For example, a dipyridine-based compound represented by the following general formula (1) is more preferable.

<General Formula (1)>

In the general formula (1), R1 and R2 are each independently a C1-C8 alkyl group that may have a substituent, or an aryl group, and at least one of R1 and R2 contains a substituent selected from COOH, $PO(OH)_2$, and $Si(OC_kH_{2k+1})_3$ (with proviso that k is 1 to 20).

In the general formula (1), X is a monovalent anion. The monovalent anion is appropriately selected depending on the intended purpose without any limitation, provided that it stably forms a pair with a cation site Examples of the monovalent anion include Br ion ($Br^-$), Cl ion ($Cl^-$), $ClO_4$ ion ($ClO_4^-$), $PF_6$ ion ($PF_6^-$), and $BF_4$ ion ($BF_4^-$).

In the general formula (1), n, m, and l are each 0, 1, or 2.

In the general formula (1), A, B, and C are each independently a C1-C20 alkyl group that may have a substituent, an aryl group, and a heterocyclic group.

As for a metal complex-based, or metal oxide-based electrochromic compound, for example, usable is an inorganic electrochromic compound, such as titanium oxide, vanadium oxide, tungsten oxide, indium oxide, iridium oxide, nickel oxide, and Prussian blue.

The conductive or semiconductive particles bearing the electrochromic compound are appropriately selected depending on the intended purpose without any limitation, but metal oxide is preferably used as the particles.

Examples of the metal oxide include metal oxide containing, as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide nickel oxide, cobalt oxide, barium oxide, strontium oxide, vanadium oxide, aminosilicate, calcium phosphate, or aluminosilicate. These may be used alone, or in combination.

Among them, at least one selected from the group consisting of titanium oxide, zinc oxide, tin oxide, zirconium oxide, iron oxide, magnesium oxide, indium oxide, and tungsten oxide is preferable in view of electrical properties, such as electric conduction, and physical properties such as optical characteristics. Particularly preferred is titanium oxide, as a color display having excellent a response speed of a color is enabled.

Moreover, shapes of the conductive or semiconductive particles are appropriately selected depending on the intended purpose without any limitation, but the shapes having a large surface area per unit volume (may be referred as "specific surface area" hereinafter) are used in order to efficiently bear the electrochromic compound thereon. In the case where the particles are an aggregate of nano particles, for example, the electrochromic compound is more efficiently born thereon, as it has a large specific surface area, to provide an excellent display contrast ratio of coloring and discharging.

A layer composed of the electrochromic layer 13 and the conductive or semiconductive particles can be formed by vacuum film formation, but is preferably formed by applying a particle dispersion paste through coating in view of productivity.

A thickness of the electrochromic layer 13 is appropriately selected depending on the intended purpose without any limitation, but the thickness thereof is preferably 0.2 μm to 5.0

μm. When the thickness thereof is less than 0.2 μm, a desired coloring density may not be attained. When the thickness thereof is greater than 5.0 μm, visibility may be lowered by tinting, as well as increasing a production cost.

[Electrolyte Layer]

The electrolyte layer 14 contains inorganic particles, and is formed as a film, in which an electrolyte is included in a photocurable or heat curable resin.

The electrolyte layer is preferably a film, which is formed by applying a solution prepared by mixing the inorganic particles, a curable resin, and an electrolyte, onto the electrochromic layer 13, followed by curing with light or heat. The electrolyte layer may be a film, which is formed by forming porous inorganic particle layer, and applying a solution prepared by mixing a curable resin and an electrolyte in a manner that the solution permeates the inorganic particle layer, followed by curing with light or heat. In the case where the electrochromic layer 13 is a layer, in which the electrochromic compound is born on the conductive or semiconductive nano particles, moreover, the electrolyte layer may be a film formed by applying a solution prepared by mixing a curable resin and an electrolyte onto the electrochromic layer in a manner that the solution permeates the electrochromic layer, followed by curing with light or heat.

As for the electrolytic solution, a solution, in which a liquid electrolyte (e.g., an ionic liquid) or a solid electrolyte is dissolved in a solvent, is used.

As for a material of the electrolyte, for example, an inorganic salt (e.g., alkali metal salt, and alkaline earth metal salt), quaternary ammonium salt, or supporting electrolyte of acid or alkali can be used. Specific examples thereof include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

The ionic liquid is not particularly limited, and may be any of materials that have been typically researched and reported.

An organic ionic liquid has a molecular structure that exhibits a liquid state in a wide range of temperature including room temperature.

The molecular structure is composed of a cationic component and an anionic component.

Examples of the cationic component include: an imidazole derivative, such as N,N-dimethyl imidazole salt, N,N-methylethyl imidazole salt, and N,N-methylpropyl imidazole salt; an aromatic salt, such as a pyridinium derivative (e.g., N,N-dimethylpyridinium salt, and N,N-methylpropyl pyridinium salt); and an aliphatic quaternary ammonium-based compound, such as tetraalkyl ammonium (e.g., trimethylpropyl ammonium salt, trimethylhexyl ammonium salt, and triethylhexyl ammonium salt).

The anion component is preferably a fluorine-containing compound in view of stability in the atmosphere, and examples thereof include $BF_4^-$, $CF_3SO_3^-$, $PF_4^-$, $(CF_3SO_2)_2N^-$, and $B(CN_4)^-$. The ionic liquid formulated with a combination of the aforementioned cation component and the aforementioned anion component can be used.

As for the solvent, for example, usable are propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohol, and a mixed solvent of any combination of the aforementioned solvents.

Examples of the curable resin include a typical material, such as a photocurable resin, and a heat-curable resin (e.g., an acrylic resin, a urethane resin, an epoxy resin, a vinyl chloride resin, an ethylene resin, a melamine resin, and a phenol resin.

The curable resin is preferably a material having high compatibility to the electrolyte. As for the material having such a structure, preferred is a derivative of ethylene glycol, such as polyethylene glycol, and polypropylene glycol. As for the curable resin, moreover, a photocurable resin is preferably used, because an element can be produced at low temperature within a short period compared to a method for forming a film through thermal polymerization, or evaporation of the solvent.

The inorganic particles are not particularly limited, as long as they are a material that can form a porous layer, and can bear the electrolyte and the curable resin. The inorganic particles are preferably a material having high insulating properties, transparency, and durability in view of stability of an electrochromic reaction. Specific examples of the material include oxide or sulfide of silicon, aluminium, titanium, zinc, and tin, and a mixture thereof.

Sizes (the average particle diameter) of the inorganic particles are appropriately selected depending on the intended purpose without any limitation, but the average particle diameter thereof is preferably 10 nm to 10 μm, more preferably 10 nm to 100 nm.

[Protective Layer]

The protective layer 16 is formed on the support 11 in a manner that the protective layer 16 covers a top surface of the second electrode layer 15. Depending on a case, the protective layer 16 is formed to cover side surfaces of each layer. The protective layer 16 can be formed, for example, by applying a UV-curable or heat-curable insulating resin onto the support 11 to over side surfaces of the first electrode layer 12, side surfaces of the electrochromic layer 13, side surfaces of the electrolyte layer 14, and side surfaces and a top surface of the second electrode layer 15, followed by curing the resin. Moreover, it is more preferred that the protective layer is a laminate protective layer composed of a curable resin and an inorganic material. Barrier properties of the protective layer against oxygen and water are improved by giving the laminate structure with the inorganic material.

As for the inorganic material, a material having high insulation properties, transparency, and durability is preferable. Specific examples of the inorganic material include oxide or sulfide of silicon, aluminium, titanium, zinc, and tin, and a mixture thereof. A film of any of these materials can be easily formed by a vacuum film forming process, such as sputtering, and vapor deposition.

A thickness of the protective layer 16 is appropriately selected depending on the intended purpose without any limitation, but the thickness thereof is preferably 0.5 μm to 10 μm.

<Electrochromic Device of Second Embodiment>

The electrochromic device of the second embodiment is an example of the electrochromic device, which has a different layer structure from the first embodiment. Note that, in the second embodiment, descriptions of a constitutional part identical to that in the already explained embodiment may be omitted.

Figure 2:
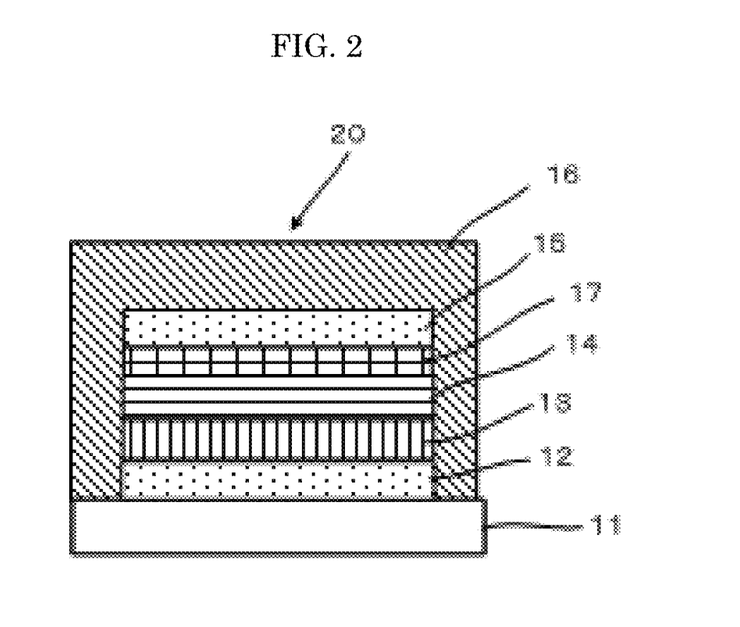
FIG. 2 is a schematic cross-sectional view illustrating one example of an electrochromic device of the second embodiment.

FIG. 2 is a cross-sectional view illustrating an example of the electrochromic device of the second embodiment.

With reference to FIG. 2, the electrochromic device 20 of the second embodiment is different from the electrochromic device 10 of the first embodiment (see FIG. 1) in that the antideterioration layer 17 is formed in contact with the electrolyte layer 14 and the second electrode layer 15.

In the second embodiment, an antideterioration layer 17 is formed in order to prevent a deterioration caused by an electrochemical reaction of the second electrode layer 15. As a result, an electrochromic device, which has excellent repeating properties in addition to the effects obtainable by the first embodiment can be provided in accordance with the electrochromic device of the second embodiment.

The antideterioration layer 17 constituting the electrochromic device 20 is explained hereinafter.

[Antideterioration Layer]

A role of the antideterioration layer 17 is to carry out a reverse chemical reaction to that of the electrochromic layer 13 to balance the electric charge, t thereby prevent corrosion or deterioration of the second electrode layer 15, which may be caused by an irreversible oxidation and reduction reaction. As a result, stability in repetitive use of the electrochromic device 10 is improved. Note that, the reverse reaction include functioning as a capacitor as well as a case the antideterioration layer is oxidized and reduced.

A material of the antideterioration layer 17 is not particularly limited, as long as it is a material that functions to prevent corrosion caused by an irreversible oxidation and reduction reaction of the first electrode layer 12 and the second electrode layer 15. As for the material of the antideterioration layer 17, for example, antimony tin oxide, nickel oxide, titanium oxide, zinc oxide, tin oxide, or conductive or semiconductive metal oxide containing a plurality of the above-listed materials. In the case where a tint of the antideterioration layer does not cause a problem, moreover, the same material to the aforementioned electrochromic material can be used.

Particularly in the case where an electrochromic device is produced as an optical element, which requires transparency, such as a lens, a material having a high transparency is preferably used as the antideterioration layer 17. As for such a material, n-type semiconductive oxide particles (n-type semiconductive metal oxide) are preferably used. Specific examples thereof include titanium oxide, tin oxide, zinc oxide, compound particles containing a plurality of the aforementioned materials, and a mixture thereof, each of which are composed of particles having a primary particle diameter of 100 nm or smaller.

In the case the aforementioned antideterioration layer 17 is used, moreover, the electrochromic layer is preferably composed of a material, which changes from a colored state to transparent through an oxidation reaction. As a result, the n-type semiconductive metal oxide is easily reduced (electron injection) at the same time as the oxidation reaction of the electrochromic layer, and thus driving voltage can be reduced.

In the aforementioned embodiment, the particularly preferable electrochromic material is an organic polymer material. Use of the organic polymer material allows easy film formation through a coating process, and enables to adjust or control a color with adjusting a molecular structure thereof. Specific examples of the organic polymer materials include those reported in Chemistry of Materials review 2011. 23, 397-415, Navigating the Color Palette of Solution-Processable Electrochromic Polymers (Reynolds); Macromolecules 1996.29 7629-7630 (Reynolds); and Polymer journal, Vol. 41, No. 7, Electrochromic Organic Metallic Hybrid Polymers.

Examples of such the organic polymer material include a poly(3,4-ethylenedioxythiophene)-based material, and a chain-forming polymer between bis(terpyridine) and iron ion.

Meanwhile, examples of a material of a p-type semiconductor layer having a high transparency used as the antideterioration layer 17 include an organic material containing nitroxyl radicals (NO radicals), is such as a derivative of 2,2,6,6-tetramethylpiperidine-N-oxyl (TEMPO), and a polymer material of the derivative.

Note that, an antideterioration function may be provided to the electrolyte layer 14 by mixing a material for the antideterioration layer to the electrolyte layer 14 without separately forming the antideterioration layer 17. In this case, the layer structure of the electrochromic device is identical to that of the electrochromic device of the second embodiment illustrated in FIG. 1.

Examples of a formation method of the antideterioration layer 17 include vacuum vapor deposition, sputtering, and ion plating. Examples of the formation method that allows coating of the material of the antideterioration layer 17 include various printing methods, such as spin coating, cast coating, micro gravure coating, gravure coating, bar coating, roll coating, wire bar coating, dip coating, slit coating, capillary coating, spray coating, nozzle coating, gravure printing, screen printing, flexographic printing, offset printing, inverse printing, and inkjet printing.

<Electrochromic Device of Third Embodiment>

The electrochromic device of the third embodiment is an example of the electrochromic device, which has a different layer structure from the second embodiment. Note that, in the third embodiment, descriptions of a constitutional part identical to that in the already explained embodiment may be omitted.

Figure 3:
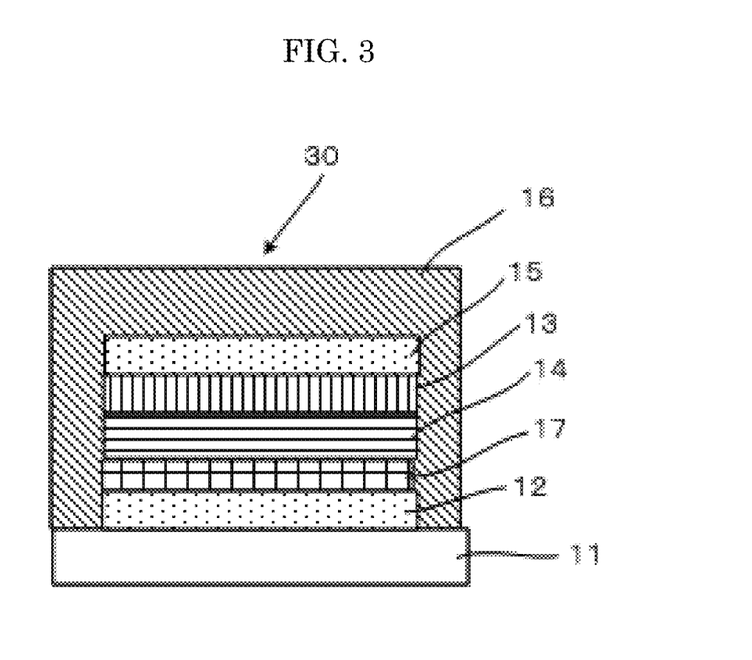
FIG. 3 is a schematic cross-sectional view illustrating one example of an electrochromic device of the third embodiment.

FIG. 3 is a cross-sectional view illustrating an example of the electrochromic device of the third embodiment. With reference to FIG. 3, the electrochromic device 30 of the third embodiment is different from the electrochromic device 20 of the second embodiment (see FIG. 2) in that is the positions of the electrochromic layer 13 and the antideterioration layer 17 are reversed.

Accordingly, the electrochromic device of the present invention can be operated in the same manner even when the positions of the electrochromic layer 13 and the antideterioration layer 17 are replaced to each other. Therefore, an arrangement which gives excellent process resistance to a material laminated on top can be used, to thereby improve productivity.

Particularly in the case where plastic is used as a supporting board, such as a polyethylene terephthalate (PET) substrate, a coating process, which is a low temperature process, is typically used. In this case, the present embodiment is effective, as a resistance to the coating liquid is required in view of productivity.

<Electrochromic Device of Fourth Embodiment>

The electrochromic device of the fourth embodiment is an example of the electrochromic device, which has a different layer structure from the third embodiment. Note that, descriptions of a constitutional part identical to that in the already explained third embodiment may be omitted.

Figure 4:
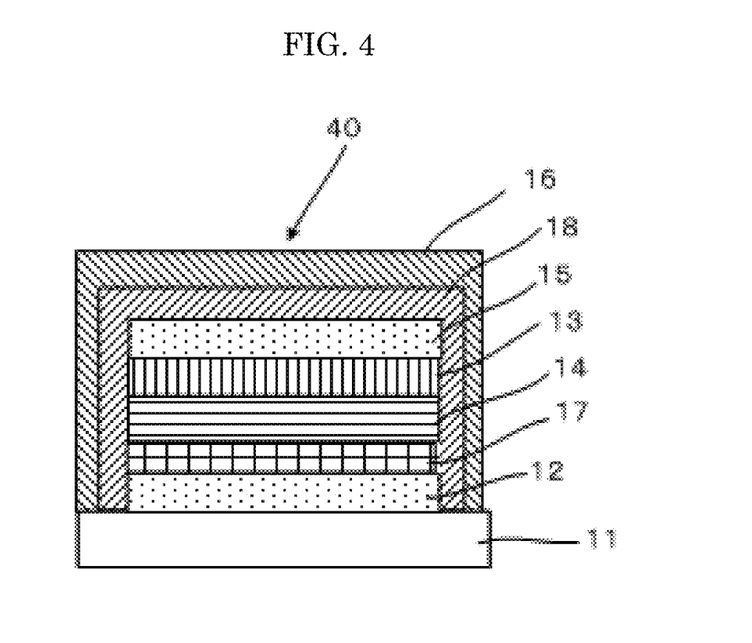
FIG. 4 is a schematic cross-sectional view illustrating one example of an electrochromic device of the fourth embodiment.

FIG. 4 is a cross-sectional view illustrating an example of the electrochromic device of the fourth embodiment. With reference to FIG. 4, the electrochromic device 40 of the fourth embodiment is different from the electrochromic device 30 of the third embodiment (see FIG. 3) in that a release layer 18 is formed in contact with the electrode layer 15.

In the electrochromic device 40 of the fourth embodiment, a release layer 18 is formed for the purpose of controlling adhesion to the second electrode layer 15. A contact area with the second electrode can be easily formed by releasing the release layer 18 from the second electrode layer 15 in the state that the adhesion to the electrode layer 15 is weakened. As a result, a line contact with the second electrode layer can be achieved at an arbitral position. Therefore, the electrochromic device formed on the substrate is processed into an arbitral shape, followed by performing assembling. It is hence not necessary to prepare a mold or member for each shape of a product, and the production of a small volume but large varieties can be easily performed.

The release layer 18 for constituting the electrochromic device 40 is explained hereinafter.

[Release Layer]

As for the release layer 18, formed is a layer, which is deformed or softened by application of external stimuli, such as heat or light, to thereby reduce adhesion to the second electrode layer 15. particularly, the layer which reduces the adhesion upon application of heat is preferable, as it is easily formed. Examples of such a material include a low molecular weight polymer having a melting point in the range of 50° C. to 200° C. Among them, polyethylene glycol is preferable. Moreover, a commercially available heat-release adhesive can be used. Moreover, the protective layer may also function as a release layer.

As for a formation method of the release layer 18, for example, in a coating method, various printing methods can be used, such as spin coating, cast coating, micro gravure coating, gravure coating, bar coating, roll coating, wire bar coating, dip coating, slit coating, capillary coating, spray coating, nozzle coating, gravure printing, screen printing, flexographic printing, offset printing, inverse printing, and inkjet printing.

A thickness of the release layer 18 is appropriately selected depending on the intended purpose without any limitation, but the thickness thereof is preferably 0.5 μm to 10 μm.

<Electrochromic Device of Fifth Embodiment>

The electrochromic device of the fifth embodiment is an example of the electrochromic device, which has a different layer structure from the fourth embodiment. Note that, in the fifth embodiment, descriptions of a constitutional part identical to that in the already explained embodiment may be omitted.

Figure 5:
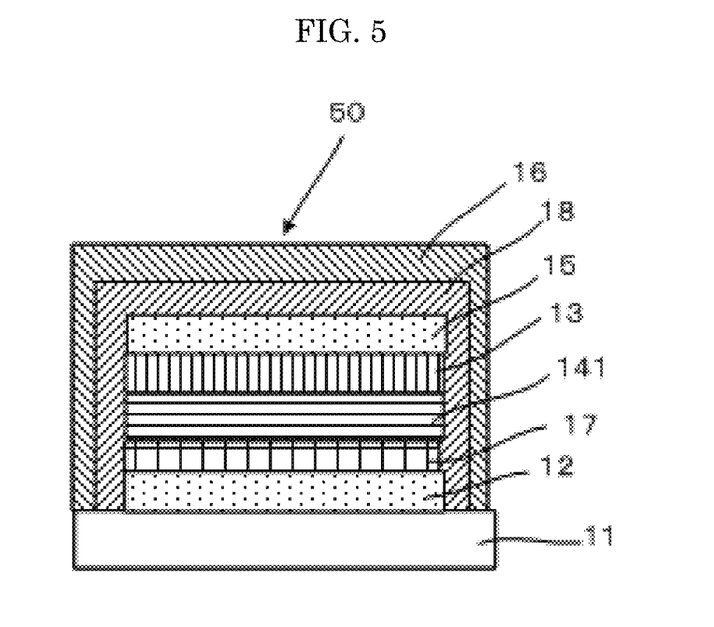
FIG. 5 is a schematic cross-sectional view illustrating one example of an electrochromic device of the fifth embodiment.

FIG. 5 is a cross-sectional view illustrating an example of the electrochromic device of the fifth embodiment. With reference to FIG. 5, the electrochromic device 50 of the fifth embodiment is different from the electrochromic device 40 of the fourth embodiment (see FIG. 4) in that the organic particles of the electrolyte layer also functions as a white reflection layer.

In the electrochromic device of the fifth embodiment, the electrolyte layer 14 is a layer 141, in which white pigment particles are contained in the electrolyte layer 14, and which functions as a white reflection layer. Examples of a material of the white pigment particles include titanium oxide, aluminium oxide, zinc oxide, silica, cesium oxide, and yttrium oxide.

As described above, the electrochromic device of the fifth embodiment can exhibit an advantageous effect, such as a reflective display element is easily provided, in addition to the effects obtainable with the fourth embodiment, as the electrolyte layer 14 is functioned as a white reflective layer by adding white pigment particles.

<Electrochromic Device of Sixth Embodiment>

The electrochromic device of the sixth embodiment is an example of the electrochromic device, which has a different support to that of the support of the fourth embodiment. Note that, in the sixth embodiment, descriptions of a constitutional part identical to that in the already explained embodiment may be omitted.

Figure 6:
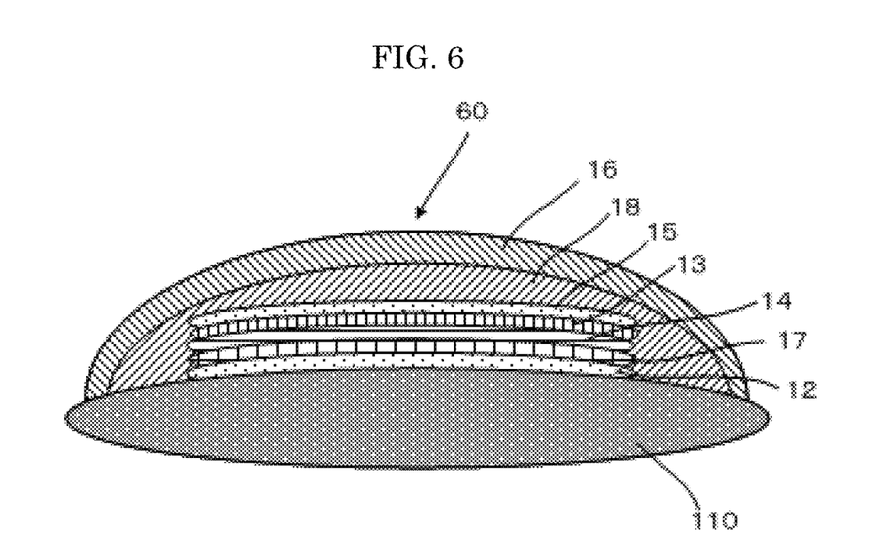
FIG. 6 is a schematic cross-sectional view illustrating one example of an electrochromic device of the sixth embodiment.

FIG. 6 is a cross-sectional view illustrating one example of the electrochromic device of the sixth embodiment. With reference to FIG. 6, the electrochromic device 60 of the sixth embodiment is different from the electrochromic device 40 of the fourth embodiment (see FIG. 4) in that the support 11 is replaced with a support 110.

The support 110 is an optical lens. A surface of the support 110, on which each layer is formed, is a curved surface. Therefore, formation of each layer is extremely difficult according to a conventional method where two supports are bonded with an electrolytic layer filled between the supports. In the present embodiment, on the other hand, each layer can be formed by laminating in the same manner as in the case where a surface of the support, on which each layer is formed, is a flat surface, even in the case where the surface of the support is a curved surface, because of the production process thereof without a bonding process, as described above. Note that, the support 110 may be a lens of spectacles.

As mentioned above, the electrochromic device of the sixth embodiment can further exhibits the following effects in addition to the effects obtainable by the first embodiment. Specifically, as the support having a curved surface on which each layer is formed can be used, an optical element having a curved surface, such as an optical lens or lens of spectacles can be selected as the support. Use of the optical element, such as an optical lens or lens of spectacles, can realize an electrochromic device that can easily control light (an optical device capable of electrically controlling light). Furthermore, a line contact can be easily formed according to the shape of the lens after being processed.

EXAMPLES

The present invention is explained through examples thereinafter, but the present invention is not limited to these examples.

Example 1

Production of Electrochromic Device

Example 1 is an example for producing the electrochromic device 10 illustrated in FIG. 1. Note that, the electrochromic device 10 produced in Example 1 can be used as a light control glass device.

<<Formation of First Electrode Layer and Electrochromic Layer>>

First, a glass substrate in the size of 40 mm×40 mm, and having a thickness of 0.7 mm was prepared as the support 11.

On this glass substrate, an ITO film having a thickness of 100 nm was formed in a region of 20 mm×20 mm, and a drawing part by sputtering through a metal mask, to thereby form a first electrode layer 12.

Next, a titanium oxide nanoparticle dispersion liquid (product name: SP210, manufactured by SHOWA TITANIUM CO., LTD., average particle diameter: 20 nm) was applied on a surface of the ITO film by spin coating, followed by annealing at 120° C. for 15 minutes, to thereby form a nano-structure semiconductor material formed of a titanium oxide particle film having a thickness of 1.0 μm.

Subsequently, a 2,2,3,3-tetrafluoropropanol solution containing 1.5% by mass of the compound represented by the following structural formula A as an electrochromic compound was applied by spin coating, followed by performing annealing at 120° C. for 10 minutes, to allow the titanium oxide particle film to bear (adsorb) the electrochromic compound, to thereby form an electrochromic layer 13.

[Structural Formula A]

Subsequently, a SiO$_2$ particle (average primary particle diameter: 20 μm) dispersion liquid (silica solid content: 24.8% by mass, polyvinyl alcohol: 1.2% by mass, and water: 74% by mass) was applied on the electrochromic layer 13 by spin coating, to thereby form an insulating inorganic particle layer. A thickness of the formed insulating inorganic particle layer was 2 μm.

Subsequently, a solution prepared by mixing polyethylene diacrylate, a photo initiator (IRG184, manufactured by BASF), and an electrolyte (1-ethyl-3-methylimidazolium salt) at a mass ratio of 100/5/20 was applied on a surface of the insulating inorganic particle layer, and the solution was cured with UV in the atmosphere of N$_2$, to thereby form a solid electrolyte layer 14 having a thickness of 2 μm.

Moreover, an ITO film having a thickness of 100 nm was formed on the solid electrolyte layer 14 at a region of 20 mm×20 mm, which overlapped with the ITO film formed as the first electrode layer 12, and a different region to that of the first electrode layer 12 by sputtering through a metal mask, to thereby form a second electrode layer 15. Note that, the ITO film formed on the different region to that of the first electrode layer 12 was a drawing part of the second electrode layer 15. The sheet resistance of the second electrode layer 15 was about 100Ω/□.

<<Formation of Protective Layer>>

Next, a UV-ray curable adhesive (product name: NOPCO134, manufactured by SAN NOPCO LIMITED) was applied onto the second electrode layer 15 by spin coating, followed by curing the adhesive through UV light irradiation, to thereby form a protective layer 16 having a thickness of 3 μm. In the manner as described, the electrochromic device 10 of Example 1 illustrated in FIG. 1 was produced.

<<Coloring and Discharging>>

Coloring and discharging of the produced electrochromic device 10 were confirmed. Specifically, voltage of −3 V was applied between the drawing part of the first electrode layer 12 and the drawing part of the second electrode layer 15 for 3 seconds. As a result, coloring of magenta originated from the electrochromic compound of the structural formula A was confirmed at the area where the first electrode layer 12 and the second electrode layer 15 were overlapped.

Moreover, voltage of +3 V was applied between the drawing part of the first electrode layer 12 and the drawing part of the second electrode layer 15 for 3 seconds. As a result, it was confirmed that the color of the dye was discharged at the area where the first electrode layer 12 and the second electrode layer 15 were overlapped, and became clear.

Example 2

Production of Electrochromic Device

Example 2 is an example for producing the electrochromic device 30 illustrated in FIG. 3. Note that, the electrochromic device 30 produced in Example 2 can be used as a light control glass device.

On a surface of the first electrode layer 12, a titanium oxide nanoparticle dispersion liquid (product name: SP210, manufactured by SHOWA TITANIUM CO., LTD., average particle diameter: 20 nm) was applied by spin coating, followed by performing annealing at 120° C. for 15 minutes, to thereby form a nano-structure semiconductor material formed of a titanium oxide particle film having a thickness of 1.0 μm. The formed film was used as an antideterioration layer 17.

Moreover, a toluene solution containing 2.5% by mass of the compound (weight average molecular weight: 10,000) represented by the following general formula B was applied as an electrochromic layer 13 on a surface of the electrolyte layer 14 by spin coating.

[General Formula B]

In the general formula B, n is a number of the polymerization degree.

Thereafter, annealing was performed at 120° C. for 10 minutes, to thereby form an electrochromic layer 13 formed of the organic polymer material. Other than those mentioned above, the electrochromic device 30 illustrated in FIG. 3 was produced in the same manner as in Example 1.

<<Coloring and Discharging>>

Coloring and discharging of the produced electrochromic device 30 were confirmed. Specifically, voltage of +3 V was applied between the drawing part of the first electrode layer 12 and the drawing part of the second electrode layer 15 for 3 seconds. As a result, it was confirmed that the color of the dye was discharged at the area where the first electrode layer 12 and the second electrode layer 15 were overlapped, and became clear.

Moreover, voltage of −3 V was applied between the drawing part of the first electrode layer 12 and the drawing part of the second electrode layer 15 for 3 seconds. As a result, the dye in the area where the first electrode layer 12 and the second electrode layer 15 were overlapped colored in magenta to return back to the initial state.

Example 3

Production of Electrochromic Device

Example 3 is an example for producing the electrochromic device 40 illustrated in FIG. 4. Note that, the electrochromic device 40 produced in Example 3 can be used as a light control glass device.

The electrochromic device 40 illustrated in FIG. 4 was produced in the same manner as in Example 2, provided that a release layer 18 having a thickness of 5 μm was formed by applying a coating liquid, in which polyethylene glycol (weight average molecular weight: 200,000) was dissolved in 2-methoxy ethanol in an amount of 3% by mass onto a surface of the second electrode layer 15 through spin coating, and the electrolyte layer 14 was directly formed onto the antideterioration layer 17 without forming the insulating inorganic particle layer.

<<Coloring and Discharging>>

Coloring and discharging of the produced electrochromic device 40 were confirmed. Specifically, voltage of +3 V was applied between the drawing part of the first electrode layer 12 and the drawing part of the second electrode layer 15 for 3 seconds. As a result, it was confirmed that the color of the dye was discharged at the area where the first electrode layer 12 and the second electrode layer 15 were overlapped, and became clear.

Moreover, voltage of −3 V was applied between the drawing part of the first electrode layer 12 and the drawing part of the second electrode layer 15 for 3 seconds. As a result, the dye in the area where the first electrode layer 12 and the second electrode layer 15 were overlapped colored in magenta to return back to the initial state.

<<Formation of Contact Area with Second Electrode Layer>>

A centric region (a square with a side of 5 mm) of the region of 20 mm×20 mm of the produced electrochromic device 40, where the first electrode layer 12 and the second electrode layer 15 were overlapped, was heated to 80° C., and the region of protective layer 16 was slit and released with a tape. Subsequently, a silver paste was dropped in the released portion, to thereby form a contact area with the second electrode layer 15.

Voltage of +3 V was applied between the drawing part of the first electrode layer 12 and the contact area of the second electrode layer 15. As a result, it was confirmed that the color of the dye in the region where the first electrode layer 12 and the second electrode layer 15 were overlapped was discharged, and became clear.

Moreover, voltage of −3 V was applied between the drawing part of the first electrode layer 12 and the contact area of the second electrode layer 15. As a result, it was confirmed that the dye in the region where the first electrode layer 12 and the second electrode layer 15 were overlapped was colored in magenta, and was turned back to the initial state.

Example 4

Production of Electrochromic Device

Example 4 is an example for producing the electrochromic device 50 illustrated in FIG. 5. Note that, the electrochromic device 50 produced in Example 4 can be used as a reflective display device.

The electrochromic device 50 illustrated in FIG. 5 was produced in the same manner as in Example 3, provided that an insulating inorganic particle layer (white reflection layer) was formed by adding white titanium oxide particles having the average particle diameter of 250 nm were added to the $SiO_2$ particle dispersion liquid in an amount of 50% by mass relative to the silica particles.

<<Coloring and Discharging>>

Coloring and discharging of the produced electrochromic device 50 were confirmed. Specifically, voltage of +3 V was applied between the drawing part of the first electrode layer 12 and the drawing part of the second electrode layer 15 for 3 seconds. As a result, it was confirmed that the color of the dye was discharged at the area where the first electrode layer 12 and the second electrode layer 15 were overlapped, and became white.

Moreover, voltage of −3 V was applied between the drawing part of the first electrode layer 12 and the drawing part of the second electrode layer 15 for 3 seconds. As a result, the dye in the area where the first electrode layer 12 and the second electrode layer 15 were overlapped colored in magenta to return back to the initial state.

The preferable embodiments and examples are described above, but the present invention is not limited to the aforementioned embodiments and examples. Various modifications and substitutions may be made upon the aforementioned embodiments and examples in the spirit of the range specified in the claims within the present invention. For example, the aforementioned embodiments may be appropriately combined for use.

The embodiments of the present invention are, for example, as follows:

<1> An electrochromic device, containing:
one support;
a first electrode layer formed on the support;
a second electrode layer provided to face the first electrode layer;
an electrochromic layer provided to be in contact with the first electrode layer or the second electrode layer;
a solid electrolyte layer containing inorganic particles, which is filled between the first electrode layer and the second electrode layer, and is provided to be in contact with the electrochromic layer; and
a protective layer provided on the second electrode layer.
<2> The electrochromic device according to <1>, further containing an antideterioration layer on the electrode layer facing the electrochromic layer.
<3> The electrochromic device according to <1> or <2>, wherein the inorganic particles contain insulating metal oxide particles.
<4> The electrochromic device according to according to any one of <1> to <3>, wherein the inorganic particles contain white reflection particles.
<5> The electrochromic device according to any one of <1> to <4>, further containing a release layer on the second electrode layer.
<6> The electrochromic device according to <5>, wherein the release layer contains a material that is softened or dissolved upon application of heat.
<7> The electrochromic device according to any one of <1> to <6>, wherein the support is an optical element.
<8> A method for producing the electrochromic device according to any one of <1> to <7>, the method containing:
peeling a portion that is present above the second electrode layer from the support, to thereby form a contact area with the second electrode layer.

This application claims priority to Japanese application No. 2014-005482, filed on Jan. 15, 2014 and incorporated herein by reference.

What is claimed is:

1. An electrochromic device, comprising:
   one support;
   a first electrode layer formed on the support;
   a second electrode layer provided to face the first electrode layer;
   an electrochromic layer provided to be in contact with the first electrode layer or the second electrode layer;
   a solid electrolyte layer containing inorganic particles, which is filled between the first electrode layer and the second electrode layer, and is provided to be in contact with the electrochromic layer; and
   a protective layer provided on the second electrode layer.

2. The electrochromic device according to claim 1, further comprising an antideterioration layer on the electrode layer facing the electrochromic layer.

3. The electrochromic device according to claim 1, wherein the inorganic particles contain insulating metal oxide particles.

4. The electrochromic device according to claim 1, wherein the inorganic particles contain white reflection particles.

5. The electrochromic device according to claim 1, further comprising a release layer on the second electrode layer.

6. The electrochromic device according to claim 5, wherein the release layer contains a material that is softened or dissolved upon application of heat.

7. The electrochromic device according to claim 1, wherein the support is an optical element.

8. A method for producing the electrochromic device according to claim 1, the method comprising:
   peeling a portion that is present above the second electrode layer from the support, to thereby form a contact area with the second electrode layer.

* * * * *